United States Patent
Wagner et al.

(10) Patent No.: US 7,943,682 B2
(45) Date of Patent: May 17, 2011

(54) RADIATION-CURABLE WATER-EMULSIFIABLE POLYISOCYANATES

(75) Inventors: Eva Wagner, Bad Duerkheim (DE); Erich Beck, Ladenburg (DE); Angelika Maria Steinbrecher, Stuttgart (DE); Yvonne Heischkel, Mannheim (DE); Reinhold Schwalm, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 52 days.

(21) Appl. No.: 12/094,281

(22) PCT Filed: Nov. 23, 2006

(86) PCT No.: PCT/EP2006/068831
§ 371 (c)(1),
(2), (4) Date: May 20, 2008

(87) PCT Pub. No.: WO2007/063027
PCT Pub. Date: Jun. 7, 2007

(65) Prior Publication Data
US 2008/0300338 A1    Dec. 4, 2008

(30) Foreign Application Priority Data

Dec. 1, 2005  (DE) .......................... 10 2005 057 682

(51) Int. Cl.
C08G 18/67 (2006.01)
C08G 69/26 (2006.01)
C08G 18/24 (2006.01)
C08F 2/00 (2006.01)

(52) U.S. Cl. ........ 522/174; 522/186; 524/538; 524/539; 524/590; 528/60; 528/73

(58) Field of Classification Search ................. 522/174, 522/186, 107, 173, 109; 528/60, 73, 59, 528/61, 65; 524/538–539, 593, 590
See application file for complete search history.

(56) References Cited

U.S. PATENT DOCUMENTS

| | | | |
|---|---|---|---|
| 4,192,762 A | 3/1980 | Osborn | |
| 4,644,030 A * | 2/1987 | Loewrigkeit et al. | 524/457 |
| 5,137,961 A * | 8/1992 | Goos et al. | 524/457 |
| 5,235,018 A | 8/1993 | Potter et al. | |
| 5,459,214 A | 10/1995 | Brahm et al. | |
| 5,739,251 A | 4/1998 | Venham et al. | |
| 5,767,220 A | 6/1998 | Venham et al. | |
| 6,420,478 B1 * | 7/2002 | Irle et al. | 524/591 |
| 6,617,413 B1 * | 9/2003 | Bruchmann et al. | 528/75 |
| 2001/0029272 A1 | 10/2001 | Schwalm et al. | |
| 2004/0006152 A1 | 1/2004 | Weikard et al. | |
| 2004/0068081 A1 * | 4/2004 | Facke et al. | 528/73 |

FOREIGN PATENT DOCUMENTS

| | | |
|---|---|---|
| DE | 198 22 890 A1 | 11/1999 |
| DE | 198 47 077 A1 | 11/1999 |
| DE | 198 53 569 A1 | 5/2000 |
| DE | 199 58 170 A1 | 6/2001 |
| DE | 102 46 512 A1 | 4/2004 |
| DE | 10 2005 008 932 A1 | 8/2006 |
| EP | 0 206 059 A2 | 12/1986 |
| EP | 0 381 862 A1 | 8/1990 |
| EP | 0 524 500 A1 | 1/1993 |
| EP | 0 928 800 A1 | 7/1999 |
| EP | 0 959 087 A1 | 11/1999 |
| EP | 1 085 065 A2 | 3/2001 |
| EP | 1 118 627 A1 | 7/2001 |
| EP | 1 138 710 A1 | 10/2001 |
| GB | 2 021 599 A | 12/1979 |
| WO | WO 00/39183 | 7/2000 |
| WO | WO 02/086000 A1 | 10/2002 |
| WO | WO 03/106577 A1 | 12/2003 |

OTHER PUBLICATIONS

Database WPI Week 200416, Derwent Publications, AN 2004-159412, XP 002431578, JP 2003-201331, Jul. 18, 2003, 2 Pages.
Database WPI Week 200429, Derwent Publications, AN 2004-307562, XP 002431579, JP 2003-183615, Jul. 3, 2003, 2 Pages.

* cited by examiner

*Primary Examiner* — Mark Eashoo
*Assistant Examiner* — Jessica Paul
(74) *Attorney, Agent, or Firm* — Oblon, Spivak, McClelland, Maier & Neustadt, L.L.P.

(57) ABSTRACT

The invention relates to radiation-curable, water-emulsifiable compounds containing isocyanate groups or capped isocyanate groups, and to their use.

17 Claims, No Drawings

RADIATION-CURABLE WATER-EMULSIFIABLE POLYISOCYANATES

The invention relates to radiation-curable, water-emulsifiable compounds containing isocyanate groups or capped isocyanate groups, and to their use.

In order to reduce the in some cases decidedly high viscosity of polyisocyanates it can be useful to dilute them with solvents. Organic solvents, however, must be removed from the coating compositions again, and then raise the level of volatile organic components (VOCs), which for reasons of environmental protection ought to be as low as possible. Polyisocyanates are therefore frequently dispersed in water, for which the polyisocyanates, however, must be capable of emulsification with water.

Water-emulsifiable polyisocyanates are widespread and are commonly synthesized from at least one isocyanate and at least one emulsifier, which can be chemically bonded to the isocyanate or is separate from it.

EP-B 206 059 describes systems of this kind and their use in, for example, adhesives.

EP-A 524 500 describes polyisocyanates which contain isocyanurate groups and are prepared using an optionally alkoxylated alcohol having at least 10 carbon atoms.

EP-A 959 087 and DE-A 198 22 890 describe polyisocyanates with polyethers as nonionic emulsifiers and also, if appropriate, ionic emulsifiers, in which at least 60 mol % of the polyethers are bonded via allophanate groups.

DE-A 199 58 170 describes similar polyisocyanates, in which 20-59 mol % of the polyethers are bonded via allophanate groups.

A disadvantage of these systems is that they are curable only by reaction with a binder containing, for example, hydroxyl groups, but not by other mechanisms, such as by radiation curing, for example.

Radiation-curable isocyanates are likewise widespread.

EP-A 928 800 describes coating compositions comprising urethane (meth)acrylates containing free isocyanate groups, photoinitiators, and isocyanate-reactive compounds.

DE-A 198 53 569 and DE-A 102 46 512 describe polyisocyanates containing iminooxadiazinetrione groups and radiation-curable groups.

A disadvantage of systems of this kind is that they are not water-emulsifiable, so that any desired application thereof from solvents has to take place from organic solvents.

EP-A 1138710 and EP-A 1085065 describe coating compositions comprising isocyanate-functional urethane (meth)acrylates and isocyanate-reactive compounds. Additional synthesis components which can be used include diols, which if appropriate may have been alkoxylated. Diols of this kind function poorly, if at all, as emulsifiers, but instead crosslink two isocyanates by reacting with their NCO groups. This raises the molar mass, so that the products have a relatively high viscosity.

Consequently, with these coating systems, it is again not possible to obtain water-emulsifiable polyisocyanates.

EP 381862 describes similar urethane acrylate systems into which ethylene oxide units are introduced by way of polyethylene glycols. As a result of these polyether diols, however, there is further crosslinking via reactive isocyanate groups, leading to molar mass increase and relatively high viscosity.

U.S. Pat. No. 5,767,220 describes polyisocyanates which contain allophanate groups, which contain (meth)acryloyl groups, and in which an alcohol component, albeit it less preferably, may comprise ether- or ester-functionalized, alkoxylated products. To that end a urethane is formed from an isocyanate with the alcohol component, said urethane is reacted with another isocyanate under allophanatization conditions, and then the allophanate is reacted with an alcohol containing ethylenically unsaturated double bonds. This means that the alcohol component is bonded to the allophanate group, whereas the alcohol, containing ethylenically unsaturated double bonds, is bonded via a urethane group.

The polyisocyanates described in U.S. Pat. No. 5,767,220, however, are substantially free from isocyanate groups, and so cannot be cured with a second component containing, for example, hydroxyl groups.

The earlier German patent application with the file reference 10 2005 008932.1 and the filing date of Feb. 24, 2005 discloses water-emulsifiable, radiation-curable compounds containing allophanate groups. There, however, there are no free isocyanate groups, and so the compounds described therein cannot be cured with a second component containing, for example, hydroxyl groups.

U.S. Pat. No. 5,459,214 describes polyisocyanates likewise containing (meth)acryloyl groups. The alcohol components listed therein, however, are not alkoxylated, and so the products are not water-emulsifiable.

U.S. Pat. No. 5,739,251 describes polyurethanes which contain allyl ether groups and if appropriate additionally contain (meth)acryloyl groups but are substantially free from isocyanate groups. Through reference to U.S. Pat. No. 5,235,018 there is also a description of alkoxylated alcohols as synthesis components.

A disadvantage thereof, however, is that allyl ether groups are not radiation-curable and the polyurethanes disclosed, being substantially free of isocyanate groups, cannot be cured with a second component containing, for example, hydroxyl groups.

WO 02/86000 describes dually curable compounds with carbamate or urea end groups, which optionally can carry anionic emulsifiable groups.

A disadvantage of these coating compositions is that the user, as a result of the curing reaction with carbamate groups, is limited to those binders capable of reaction with carbamate groups, examples including amino resins, especially methanol-etherified melamine resins. This, however, rules out whole classes of commercially available binders, restricting paint formulators' room to maneuver.

WO 00/39183 describes free-radically polymerizable isocyanates comprising activated C=C double bonds and comprising urethane groups and allophanate groups.

Such compounds, however, are not water-emulsifiable, instead rapidly reforming two-phase mixtures even after vigorous dispersion.

It was an object of the present invention to provide dually curable systems which are emulsifiable in water, which are able to react with common binders, which additionally, as far as possible, have a low viscosity, and which exhibit good surface properties. In particular there ought to be improvement over comparable compounds in at least one of the following parameters: hardness, scratch resistance, chemical resistance, adhesion, and elasticity. Moreover, the level of volatile organic components (VOCs) ought to be minimized.

This object has been achieved by means of water-emulsifiable, radiation-curable polyisocyanates (A) comprising as synthesis components a) at least one organic di- or polyisocyanate,
b) at least one compound having at least one, preferably precisely one, isocyanate-reactive group and at least one free-radically polymerizable unsaturated group and/or at least one cationically polymerizable group selected from optionally substituted acryloyl groups and optionally substituted vinyl ether groups, c) if appropriate, at least one further organic di- or polyisocyanate, different than a)

d) at least one compound having precisely one isocyanate-reactive group and at least one saturated dispersive group, e) if appropriate, at least one compound having at least two isocyanate-reactive groups, and f) if appropriate, compounds different than a) to d) and having at least one isocyanate-reactive group, wherefrom compounds carrying capped amino groups, carbamate end groups and/or urea end groups in combination with anionic dispersive compounds are excluded as synthesis components, and wherein the isocyanate content, calculated as NCO with the molecular weight 42 g/mol, is at least 3% by weight and up to 25% by weight.

Preferably, compounds carrying capped amino groups, carbamate end groups and/or urea end groups in combination with anionic or cationic dispersive compounds are excluded as synthesis components, and more preferably compounds carrying capped amino groups, carbamate end groups and/or urea end groups are excluded completely as synthesis components.

The number-average molecular weight, $M_n$, of these compounds (A) of the invention, as determined by means of gel permeation chromatography, using tetrahydrofuran as eluent and polystyrene as standard, can amount, for example, to between 200 and 50 000, preferably between 250 and 30 000, more preferably between 350 and 10 000, and in particular between 350 and 5000.

The amount of unsaturated free-radically or cationically polymerizable groups can amount, for example, to at least 0.01 mol/100 g of compound, preferably at least 0.05 mol, and more preferably at least 0.1 mol/100 g.

The amount of isocyanate groups calculated as NCO with the molecular weight 42 g/mol, amounts in accordance with the invention to at least 3%, preferably at least 5%, more preferably at least 7%, and very preferably at least 10% by weight. In general the amount of isocyanate groups is up to 25%, preferably up to 23%, more preferably up to 20%, and very preferably up to 17% by weight. If blocked isocyanate groups are comprised, then they are included in the amount of isocyanate groups as NCO groups with the molecular weight 42 g/mol.

The polyisocyanates (A) of the invention comprise as synthesis components substantially the above-recited components a), b), and d), and also, if appropriate, the components c), e) and/or f).

Additionally found have been coating compositions substantially comprising (A) a polyisocyanate of the invention, (C) if appropriate, one or more photochemically and/or thermally activable initiators, (D) if appropriate, further, typical coatings additives, (E) at least one compound having more than two isocyanate-reactive groups (binder), and (F) if appropriate, at least one compound having one or more than one free-radically polymerizable double bond.

The compounds (C) and (D) can also be added to the polyisocyanates if the aim is to provide coating formulations for preparing dual-cure coating materials.

The term "dual cure" refers in this specification to a curing operation which takes place via at least two mechanisms, specifically radiation curing, moisture curing, oxidative curing or thermal curing.

Examples of suitable components a) include aliphatic, aromatic, and cycloaliphatic di- and polyisocyanates having an NCO functionality of at least 1.8, preferably 1.8 to 5, and more preferably 2 to 4, and also their—mixed, if appropriate—isocyanurates, biurets, urethanes, allophanates, uretdiones, oxadiazinetriones, iminooxadiazinetriones and/or carbodiimides, or mixtures comprising them.

Suitable polyisocyanates include polyisocyanates containing isocyanurate groups, uretdione diisocyanates, polyisocyanates containing biuret groups, polyisocyanates containing urethane groups or allophanate groups, polyisocyanates comprising oxadiazinetrione groups or iminooxadiazinedione groups, uretonimine-modified polyisocyanates of linear or branched $C_4$-$C_{20}$ alkylene diisocyanates, cycloaliphatic diisocyanates having in total 6 to 20 carbon atoms or aromatic diisocyanates having in total 8 to 20 carbon atoms, or mixtures thereof.

The diisocyanates are preferably isocyanates having 4 to 20 carbon atoms. Examples of typical diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, and also 3 (or 4),8 (or 9)-bis-(aminomethyl)tricyclo[$5.2.1.0^{2,6}$]decane isomer mixtures, cycloaliphatic diisocyanates such as 1,4-, 1,3- or 1,2-diisocyanatocyclohexane, 4,4'- or 2,4'-di-(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chloro-2,4-phenylene diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate. Mixtures of said diisocyanates may also be present.

Examples of suitable higher isocyanates, having on average more than 2 isocyanate groups, include triisocyanates such as 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained by phosgenating corresponding aniline/formaldehyde condensates and represent polyphenyl polyisocyanates containing methylene bridges.

The di- and polyisocyanates which can be used preferably have an isocyanate group (calculated as NCO, molecular weight=42) content of 10% to 60% by weight, based on the di- and polyisocyanate (mixture), preferably 15% to 60% by weight, and more preferably 20% to 55% by weight.

Preference is given to aliphatic and/or cycloaliphatic di- and polyisocyanates, examples being the aliphatic and/or cycloaliphatic diisocyanates stated above, or mixtures thereof.

Particular preference is given to hexamethylene diisocyanate, 1,3-bis(isocyanatoethyl)cyclohexane, isophorone diisocyanate and 4,4'- or 2,4'-di(isocyanatocyclohexyl)methane, very particular preference to isophorone diisocyanate and hexamethylene diisocyanate, and especial preference to hexamethylene diisocyanate.

For the process of the invention it is possible to use not only those di- and polyisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679) and EP-A-355 443 (U.S. Pat. No. 5,087,739) for example, (cyclo)aliphatic diisocyanates, such as hexamethylene 1,6-diisocyanate (HDI), for example, isomeric aliphatic diisocyanates having 6 carbon atoms in the alkylene radical, and 1-isocyanato-3-isocyanatomethyl-3,5, 5-trimethylcyclohexane (isophorone diisocyanate or IPDI), can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place continuously in a circulation process and in the presence, if appropriate, of N-unsubstituted carbamic esters, dialkyl carbonates, and other byproducts recycled from the reaction process. Di- or polyisocyanates obtained in this way generally contain a very low fraction of chlorinated compounds, leading to favorable color numbers in the products.

In one preferred embodiment of the present invention, the di- and polyisocyanates a) and/or c) have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means of, for example, of ASTM specification D4663-98.

Preference is further given to

1) Polyisocyanates containing isocyanurate groups and derived from aromatic, aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, tris-isocyanatoalkyl and/or tris-isocyanatocycloalkyl isocyanurates, which constitute cyclic trimers of the diisocyanates, or are mixtures with their higher homologues containing more than one isocyanurate ring. The isocyanato-isocyanurates generally have an NCO content of 10% to 30% by weight, in particular 15% to 25% by weight, and an average NCO functionality of 2.6 to 8.

2) Uretdione diisocyanates with aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.

The uretdione diisocyanates can be used in the preparations as a sole component or in a mixture of other polyisocyanates, particularly those specified under 1).

3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologues. These polyisocyanates containing biuret groups generally have an NCO content of 18% to 22% by weight and an average NCO functionality of 2.8 to 4.5.

4) Polyisocyanates containing urethane and/or allophanate groups and having aromatically, aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with mono- or polyhydric alcohols such as, for example, methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol, trimethylolpropane, neopentyl glycol, pentaerythritol, 1,4-butanediol, 1,6-hexanediol, 1,3-propanediol, 2-ethyl-1,3-propanediol, 2-methyl-1,3-propanediol, ethylene glycol, diethylene glycol, triethylene glycol, tetraethylene glycol, pentaethylene glycol, glycerol, 1,2-dihydroxypropane, 2,2-dimethyl-1,2-ethanediol, 1,2-butanediol, 1,4-butanediol, 3-methylpentane-1,5-diol, 2-ethylhexane-1,3-diol, 2,4-diethyloctane-1,3-diol, hydroxypivalic acid neopentyl glycol ester, ditrimethylolpropane, dipentaerythritol, 2,2-bis(4-hydroxycyclohexyl)propane, 1,1-, 1,2-, 1,3-, and 1,4-cyclohexanedimethanol, 1,2-, 1,3- or 1,4-cyclohexanediol or mixtures thereof. These polyisocyanates containing urethane and/or allophanate groups generally have an NCO content of 12% to 20% by weight and an average NCO functionality of 2.5 to 4.5.

5) Polyisocyanates comprising oxadiazinetrione groups, derived preferably from hexamethylene diisocyanate or isophorone diisocyanate. Polyisocyanates of this kind comprising oxadiazinetrione groups are preparable from diisocyanate and carbon dioxide.

6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

7) Uretonimine-modified polyisocyanates.

8) Carbodiimide-modified polyisocyanates.

Polyisocyanates 1) to 8) may be used in a mixture, including if appropriate in a mixture with diisocyanates.

Preference is given to polyisocyanates containing isocyanurate groups or biuret groups, particular preference to polyisocyanates containing isocyanurate groups.

In a preferred alternative embodiment the amount of allophanate groups, calculated as $C_2N_2HO_3$ with a molecular weight of 101 g/mol, is at least 1.5% and up to 15% by weight.

With very particular preference the amount of oxadiazinetrione groups, calculated as $C_2N_2O_4$ with a molecular weight of 128 g/mol, is less than 15%, preferably less than 10%, more preferably less than 8%, very preferably less than 5%, in particular less than 2.5%, and especially less than 1% by weight. It may even be of advantage for the oxadiazinetrione group content to be less than 0.7%, preferably less than 0.6%, more preferably less than 0.5%, very preferably less than 0.3%, in particular less than 0.2%, and especially less than 0.1% by weight.

Suitable components b) include compounds which carry at least one, preferably precisely one, isocyanate-reactive group and at least one free-radically polymerizable and/or at least one cationically polymerizable group, selected from optionally substituted acryloyl groups and optionally substituted vinyl ether groups.

By optionally substituted acryloyl groups are meant here acryloyl groups unsubstituted or substituted one or more times in position 2 and/or 3, the carbonyl carbon representing position 1, and the substituents being selectable from the group consisting of $C_1$-$C_4$ alkyl, hydroxy-$C_1$-$C_4$ alkyl, phenyl, carboxyl(hydroxycarbonyl) and $C_1$-$C_4$ alkyloxy-carbonyl. Preference is given to methyl, phenyl, and carboxyl, particular preference to methyl and carboxyl, and very particular preference to methyl.

The optionally substituted acryloyl groups are bonded selectively via oxygen, sulfur or unsubstituted nitrogen, preferably via oxygen or unsubstituted nitrogen, and more preferably via oxygen.

Examples of preferred, optionally substituted acryloyl groups bonded via oxygen are esters of acrylic acid, methacrylic acid, crotonic acid, itaconic acid, fumaric acid, maleic acid or cinnamic acid, more preferably esters of acrylic acid and methacrylic acid, and very preferably esters of acrylic acid.

By optionally substituted vinyl ether groups are meant here vinyl ether groups unsubstituted or substituted one or more times in position 1 and/or 2, the carbon atom of the double bond which is attached to the ether oxygen atom representing position 1, and the substituents being selectable from the group consisting of $C_1$-$C_4$ alkyl, hydroxy-$C_1$-$C_4$ alkyl, phenyl, carboxyl(hydroxycarbonyl) and $C_1$-$C_4$ alkyloxy-carbonyl. Preference is given to methyl, phenyl, and carboxyl, particular preference to methyl and carboxyl, and very particular preference to methyl.

Examples of preferred vinyl ether groups are vinyloxy, propenyl-2-oxy, propenyl-1-oxy, and 2-phenylvinyloxy groups, particular preference being given to a vinyloxy group.

The number of the groups can be up to 6, preferably up to 5, more preferably up to 4, very preferably up to 3, in particular up to 2, and especially one.

Examples of possible isocyanate-reactive groups include —OH, —SH, —$NH_2$ and —$NHR^4$, wherein $R^4$ can be hydrogen or $C_1$-$C_4$ alkyl or $C_3$-$C_{12}$ cycloalkyl.

The number of the groups can be 1 to 5, preferably 1 to 4, more preferably 1 to 3, very preferably 1 to 2, and in particular one.

$C_1$-$C_4$ Alkyl for the purposes of this specification is methyl, ethyl, isopropyl, n-propyl, n-butyl, isobutyl, sec-butyl or tert-butyl.

$C_3$-$C_{12}$ Cycloalkyl for the purposes of this specification is cyclopropyl, cyclopentyl, cyclohexyl or cyclododecyl.

Preferred components b) are, for example, monoesters of α,β-unsaturated carboxylic acids, such as acrylic acid, methacrylic acid (referred to for short in this specification as "(meth)acrylic acid"), crotonic acid, itaconic acid, fumaric acid, maleic acid, acrylamidoglycolic acid, methacrylamidoglycolic acid or vinyl ethers with diols or polyols which have preferably 2 to 20 carbon atoms and at least two hydroxyl groups, such as ethylene glycol, diethylene glycol, triethylene glycol, propylene 1,2-glycol, propylene 1,3-glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, neopentyl glycol hydroxypivalate, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis(4-hydroxycyclohexyl)propane, 1,1-, 1,2-, 1,3- and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, and isomalt. In addition it is also possible to use esters or amides of (meth) acrylic acid with amino alcohols, such as 2-aminoethanol, 2-(methylamino)ethanol, 3-amino-1-propanol, 1-amino-2-propanol or 2-(2-aminoethoxy)ethanol, 2-mercaptoethanol, or polyamino alkanes, such as ethylenediamine or diethylenetriamine.

In addition suitability is also possessed by unsaturated polyetherols or polyesterols or polyacrylate polyols having an average OH functionality of 2 to 10 as compounds b).

Examples of amides of ethylenically unsaturated carboxylic acids with amino alcohols are hydroxyalkyl(meth)acrylamides such as N-hydroxymethylacrylamide, N-hydroxymethylmethacrylamide, N-hydroxyethylacrylamide, N-hydroxyethylmethacrylamide, 5-hydroxy-3-oxapentyl (meth)acrylamide, N-hydroxyalkylcrotonamides such as N-hydroxymethylcrotonamide, or N-hydroxyalkylmaleimides such as N-hydroxyethylmaleimide.

Preference is given to using 2-hydroxyethyl(meth)acrylate, 2- or 3-hydroxypropyl (meth)acrylate, 1,4-butanediol mono(meth)acrylate, 1,6-hexanediol mono(meth)acrylate, neopentyl glycol mono(meth)acrylate, glycerol mono- and di(meth)acrylate, trimethylolpropane mono- and di(meth) acrylate, pentaerythritol mono-, di-, and tri(meth)acrylate, and also 4-hydroxybutyl vinyl ether, 2-thioethyl (meth)acrylate, 2-hydroxyethyl(meth)acrylamide, 2-hydroxypropyl (meth)acrylamide or 3-hydroxypropyl(meth)acrylamide. Particular preference is given to 2-hydroxyethyl acrylate, 2-hydroxyethyl methacrylate, 2- or 3-hydroxypropyl acrylate, 1,4-butanediol monoacrylate, and 3-(acryloyloxy)-2-hydroxypropyl acrylate, and very particular preference to 2-hydroxyethyl acrylate and 2-hydroxyethyl methacrylate.

A suitable component c) is, optionally, at least one further organic di- or polyisocyanate, different than a). The isocyanates in question are the di- and polyisocyanates listed above under a).

Suitable components d) are compounds having precisely one isocyanate-reactive group and at least one dispersive group.

Compounds d) having more than one isocyanate-reactive group are expressly excluded in accordance with the invention.

The dispersive groups can be d1) anionic groups or groups which can be converted into an anionic group, d2) cationic groups or groups which can be converted into a cationic group, or d3) nonionic groups.

It will be appreciated that mixtures or hybrid forms are also conceivable.

Preferred dispersive groups are d1) or d3), with particular preference either d1) or alternatively d3).

Compounds d1) comprise precisely one group that is reactive toward isocyanate groups, and at least one hydrophilic group which is anionic or can be converted into an anionic group. Examples of the compounds in question are those as described in EP-A1 703 255, particularly from page 3, line 54 to page 4 line 38 therein, in DE-A1 197 24 199, particularly from page 3 line 4 to line 30 therein, in DE-A1 40 10 783, particularly from column 3 line 3 to line 40 therein, in DE-A1 41 13 160, particularly from column 3 line 63 to column 4 line 4 therein, and in EP-A2 548 669, particularly from page 4 line 50 to page 5 line 6 therein. These documents are hereby expressly incorporated by reference as part of the present disclosure content.

Preferred compounds d1) are those having the general formula

RG-$R^3$-DG in which

RG is at least one isocyanate-reactive group,

DG is at least one dispersive group, and $R^3$ is an aliphatic, cycloaliphatic or aromatic radical comprising 1 to 20 carbon atoms.

Examples of isocyanate-reactive groups RG are —OH, —SH, —NH$_2$ or —NHR$^4$, wherein R$^4$ has the definition recited above, but can be different than the radical used there; preferably —OH, —NH$_2$ or —NHR$^4$, more preferably —OH or —NH$_2$, and very preferably —OH.

Examples of DG are —COOH, —SO$_3$H or —PO$_3$H and also their anionic forms, with which any desired counterion may be associated—for example, Li$^+$, Na$^+$, K$^+$, Cs$^+$, Mg$^{2+}$, Ca$^{2+}$ or Ba$^{2+}$. As associated counterion it is additionally possible to have quaternary ammonium ions or ammonium ions derived from ammonia or amines, especially tertiary amines, such as, for example, ammonium, methylammonium, dimethylammonium, trimethylammonium, ethylammonium, diethylammonium, triethylammonium, tributylammonium, diisopropylethylammonium, benzyldimethylammonium, monoethanolammonium, diethanolammonium, triethanolammonium, hydroxyethyldimethylammonium, hydroxyethyldiethylammonium, monopropanolammonium, dipropanolammonium, tripropanolammonium, piperidinium, piperazinium, N,N'-dimethylpiperazinium, morpholinium, pyridinium, tetramethylammonium, triethylmethylammonium, 2-hydroxyethyltrimethylammonium, bis(2-hydroxyethyl)dimethylammonium, and tris(2-hydroxyethyl)methylammonium.

R$^3$ is preferably methylene, 1,2-ethylene, 1,2-propylene, 1,3-propylene, 1,2-butylene, 1,4-butylene, 1,3-butylene, 1,6-hexylene, 1,8-octylene, 1,12-dodecylene, 1,2-phenylene, 1,3-phenylene, 1,4-phenylene, 1,2-naphthylene, 1,3-naphthylene, 1,4-naphthylene, 1,6-naphthylene, 1,2-cyclopentylene, 1,3-cyclopentylene, 1,2-cyclohexylene, 1,3-cyclohexylene or 1,4-cyclohexylene.

The component d1) is preferably, for example, hydroxyacetic acid, tartaric acid, lactic acid, 3-hydroxypropionic acid, hydroxypivalic acid, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxysuccinic acid, hydroxydecanoic acid, ethylenediaminetriacetic acid, hydroxydodecanoic acid, hydroxyhexadecanoic acid, 12-hydroxystearic acid, aminonaphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, N-alkylated or cycloalkylated aminopropanesulfonic or aminoethanesulfonic acids, examples being N-cyclohexylaminoethanesulfonic acid or N-cyclohexylaminopropanesulfonic acid, and also their alkali metal, alkaline earth metal or ammonium salts, and with particular preference the stated monohydroxycarboxylic and monocarboxylicsulfonic acids, and also monoaminocarboxylic and monoaminosulfonic acids.

For the preparation of the dispersion, the aforementioned acids, if not already in salt form, are partly or fully neutralized, preferably with alkali metal salts or amines, preferably tertiary amines.

Compounds d2) comprise precisely one group that is reactive toward isocyanate groups, and at least one hydrophilic group which is cationic or can be converted into a cationic group, and are, for example, those compounds as described in EP-A1 582 166, particularly from page 5 line 42 to page 8 line 22 therein, and in particular from page 9 line 19 to page 15 line 34 therein, or in EP-A1 531 820, particularly from page 3 line 21 to page 4 line 57 therein, or in DE-A1 42 03 510, particularly from page 3 line 49 to page 5 line 35 therein. These documents are hereby expressly incorporated by reference as part of the present disclosure content.

Potentially cationic compounds d2) of particular practical significance are especially those containing tertiary amino groups, examples including the following: N-hydroxyalkyldialkylamines, N-aminoalkyldialkylamines, the alkyl radicals and alkanediyl units of these tertiary amines being composed, independently of one another, of 2 to 6 carbon atoms. Additionally suitable are polyethers containing tertiary nitrogen atoms and a terminal hydroxyl group, as, for example, by alkoxylation of secondary amines. Polyethers of this kind generally have a molar weight situated between 500 and 6000 g/mol.

These tertiary amines, either using acids, preferably strong mineral acids such as phosphoric acid, sulfuric acid or hydrohalic acids, strong organic acids, such as formic, acetic or lactic acid, for example, or by reaction with suitable quaternizing agents such as C$_1$ to C$_6$ alkyl halides, e.g., bromides or chlorides, or di-C$_1$ to C$_6$ alkyl sulfates or di-C$_1$ to C$_6$ alkyl carbonates, are converted into the ammonium salts.

Suitable compounds d2) having isocyanate-reactive amino groups include aminocarboxylic acids such as lysine, β-alanine, the adducts of aliphatic diprimary diamines with α,β-unsaturated carboxylic acids that are specified in DE-A2034479, such as N-(2-aminoethyl)-2-aminoethanecarboxylic acid, and also the corresponding N-aminoalkylaminoalkylcarboxylic acids, the alkanediyl units being composed of 2 to 6 carbon atoms.

Where monomers containing potentially ionic groups are employed, their conversion into the ionic form may take place before, during or, preferably, after the isocyanate polyaddition, since the solubility of the ionic monomers in the reaction mixture is frequently no more than poor. With particular preference the carboxylate groups are in the form of their salts with an alkali metal or ammonium counterion.

Compounds d3) are monofunctional polyalkylene oxide polyether alcohols obtainable by alkoxylating suitable starter molecules.

Suitable starter molecules for preparing such polyalkylene oxide polyether alcohols are thiol compounds, monohydroxy compounds of the general formula

R$^8$—O—H or secondary monoamines of the general formula

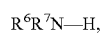

R$^6$R$^7$N—H, in which

R$^6$, R$^7$, and R$^8$ independently of one another are each independently of one another C$_1$-C$_{18}$ alkyl, C$_2$-C$_{18}$ alkyl optionally interrupted by one or more oxygen and/or sulfur atoms and/or by one or more substituted or unsubstituted imino groups, C$_6$-C$_{12}$ aryl, C$_5$-C$_{12}$ cycloalkyl or a five- to six-membered heterocycle containing oxygen, nitrogen and/or sulfur atoms, or R$^6$ and R$^7$ together form a ring which is unsaturated, saturated or aromatic and optionally interrupted by one or more oxygen and/or sulfur atoms and/or by one or more substituted or unsubstituted imino groups, it being possible for the stated radicals in each case to be substituted by functional groups, aryl, alkyl, aryloxy, alkyloxy, halogen, heteroatoms and/or heterocycles.

Preferably R$^6$, R$^7$, and R$^8$ independently of one another are C$_1$ to C$_4$ alkyl, and with particular preference R$^6$, R$^7$, and R$^8$ are methyl.

Monofunctional starter molecules suitable by way of example may be saturated monoalcohols, hence comprising no double or triple C—C or C-heteroatom bonds, such as methanol, ethanol, n-propanol, isopropanol, n-butanol, isobutanol, sec-butanol, the isomeric pentanols, hexenols, octanols, and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxymethyloxetane, or tetrahydrofurfuryl alcohol; aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis-(2-ethylhexyl)amine, N-methyl- and N-ethylcyclohexylamine or dicyclohexylamine, heterocylic secondary amines such as morpholine, pyrrolidine, piperidine or 1H-pyrazole, and also amino alcohols such as 2-dimethylaminoethanol, 2-diethylaminoethanol, 2-diisopropylaminoethanol, 2-dibutylaminoethanol, 3-(dimethylamino)-1-propanol or 1-(dimethylamino)-2-propanol.

Preferred starter molecules are alcohols having not more than 6 carbon atoms, more preferably not more than 4 carbon atoms, very preferably not more than 2 carbon atoms, and especially methanol.

Alkylene oxides suitable for the alkoxylation reaction are ethylene oxide, propylene oxide, isobutylene oxide, vinyloxirane and/or styrene oxide, which can be employed in any order (for the preparation of block copolymers) or else in a mixture (for the preparation of random copolymers) in the alkoxylation reaction.

Preferred alkylene oxides are ethylene oxide, propylene oxide, and mixtures thereof, with particular preference being given to ethylene oxide.

Preferred polyether alcohols are those based on polyalkylene oxide polyether alcohols prepared using saturated aliphatic or cycloaliphatic alcohols of the kind specified above as starter molecules. Very particular preference is given to those based on polyalkylene oxide polyether alcohols prepared using saturated aliphatic alcohols having 1 to 4 carbon atoms in the alkyl radical. Especial preference is given to polyalkylene oxide polyether alcohols prepared starting from methanol.

The monohydric polyalkylene oxide polyether alcohols contain on average in general at least 2 alkylene oxide units, preferably 5 ethylene oxide units, per molecule, in copolymerized form, with particular preference at least 7, and with very particular preference at least 10.

The monohydric polyalkylene oxide polyether alcohols contain on average in general up to 90 alkylene oxide units, preferably ethylene oxide units, per molecule, in copolymerized form, preferably up to 45, more preferably up to 40, and very preferably up to 30.

The molar weight of the monohydric polyalkylene oxide polyether alcohols is preferably up to 4000, with particular preference not above 2000 g/mol, with very particular preference not below 500 and in particular 1000±500 g/mol.

Preferred polyether alcohols are therefore compounds of the formula $$R^8\text{—O—}[\text{—}X_i\text{—}]_k\text{—H}$$

in which
$R^8$ is as defined above,
k is an integer from 2 to 90, preferably 5 to 45, more preferably 7 to 40, and very preferably 10 to 30, and
each $X_i$, independently of one another for i=1 to k, may be selected from the group consisting of —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O—, and —CHPh-CH$_2$—O—,
preferably from the group —CH$_2$—CH$_2$—O—, —CH$_2$—CH(CH$_3$)—O— and —CH(CH$_3$)—CH$_2$—O—, and more preferably —CH$_2$—CH$_2$—O—
in which Ph is phenyl and Vin is vinyl.

In one particular embodiment of the present invention the compound d) may also be an alkoxylated (meth)acrylate, one for example of the formula

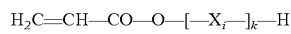

or

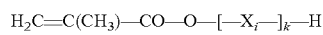

in which
$X_i$ and k can take on the definitions specified above.

Examples thereof are polyethylene oxide mono(meth)acrylate (PEA6/PEM6, Laporte Performance Chemicals Ltd.), polypropylene oxide mono(meth)acrylate (PPA6/PPM5S, Laporte Performance Chemicals Ltd.) or polyalkylene oxide mono(meth)acrylate (PEM63P, Laporte Performance Chemicals Ltd.).

Alkoxylated (meth)acrylates of this kind are bonded preferably at least in part via urethane groups, but not via allophanate groups.

Preference is given, however, to the saturated polyalkylene oxide polyether alcohols specified above.

Suitable components e) include compounds having at least two isocyanate-reactive groups, such as —OH, —SH, —NH$_2$ and/or —NHR$^5$, wherein R$^5$ has the same definition as recited above for R$^4$, but can be different than R$^4$.

Preferred compounds useful as components e) have 2-10 isocyanate-reactive groups, more preferably 2-6, very preferably 2-4, and in particular 2-3 isocyanate-reactive groups, preferably —OH and/or —NH$_2$ and more preferably —OH groups.

Examples of such compounds include polymers having a hydroxyl group content of 0.1% to 20%, preferably 0.5% to 10% by weight. The number-average molecular weight $M_n$ of such polymers is in that case preferably 1000, more preferably below 500, and very preferably below 250 g/mol.

Particularly preferred components e) are diols or polyols, such as hydrocarbon diols containing 2 to 20 carbon atoms, examples being ethylene glycol, 1,2-propanediol, 1,3-propanediol, 2-butyl-2-ethyl-1,3-propanediol, 2-ethyl-1,3-propanediol, 2-methyl-1,3-propanediol, 2-ethyl-1,3-hexanediol, 2,4-diethyloctane-1,3-diol, 1,1-dimethylethane-1,2-diol, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, bisphenol A, bisphenol F, bisphenol B, bisphenol S, 2,2-bis(4-hydroxycyclohexyl)propane, 1,1-, 1,2-, 1,3- and 1,4-cyclohexanedimethanol, trimethylolbutane, trimethylolpropane, trimethylolethane, neopentyl glycol, neopentyl glycol hydroxypivalate, pentaerythritol, glycerol, ditrimethylolpropane, dipentaerythritol, hydroquinone, etc, their esters with short-chain dicarboxylic acids, such as adipic acid, cyclohexanedicarboxylic acid, their carbonates, prepared by reacting the diols with phosgene or by transesterifying with dialkyl or diaryl carbonates, or aliphatic diamines, such as methylene- and isopropylidene-bis(cyclohexylamine), piperazine, 1,2-, 1,3- or 1,4-diaminocyclohexane, 1,2-, 1,3- or 1,4-cyclohexanebis(methylamine), etc., dithiols or polyfunctional alcohols, secondary or primary amino alcohols, such as ethanolamine, diethanolamine, monopropanolamine, dipropanolamine, etc., or thio alcohols, such as thioethylene glycol.

Additionally conceivable are diethylene glycol, triethylene glycol, dipropylene glycol, tripropylene glycol, neopentyl glycol, 1,5-pentanediol, 2-methyl-1,5-pentanediol, 2-ethyl-1,4-butanediol, erythritol and sorbitol, 2-aminoethanol, 3-amino-1-propanol, 1-amino-2-propanol or 2-(2-aminoethoxy)ethanol or butanetriol.

Also suitable, furthermore, are unsaturated polyetherols or polyesterols or polyacrylate polyols having an average OH functionality of 2 to 10, and also polyamines, such as polyethylenimine or polymers of, for example, poly-N-vinylformamide that comprise free amino groups.

Suitable components f) include compounds having at least one isocyanate-reactive group. These may be, for example, monoalcohols, mercaptans or monoamines having 1 to 20 carbon atoms, such as methanol, ethanol, isopropanol, n-propanol, n-butanol, isobutanol, sec-butanol, tert-butanol, ethylene glycol monomethyl ether, ethylene glycol monoethyl ether, diethylene glycol monomethyl ether, diethylene glycol monoethyl ether, 1,3-propanediol monomethyl ether, 1,2-propanediol monoethyl ether, 1,2-propanediol monomethyl ether, n-hexanol, n-heptanol, n-octanol, n-decanol, n-dodecanol, 2-ethylhexanol, cyclopentanol, cyclohexanol, cyclooctanol, cyclododecanol, triethylene glycol monomethyl ether, triethylene glycol monoethyl ether, n-pentanol, stearyl alcohol, cetyl alcohol, lauryl alcohol, cyclopent-2-en-1-ol, cyclopent-3-en-1-ol, cyclohex-2-en-1-ol, allyl alcohol, methylamine, ethylamine, isopropylamine, n-propylamine, n-butylamine, isobutylamine, sec-butylamine, tert-butylamine, n-pentylamine, n-hexylamine, n-heptylamine, n-octylamine, n-decylamine, n-dodecylamine, 2-ethylhexylamine, stearylamine, cetylamine, laurylamine, dimethylamine, diethylamine, di-n-propylamine, diisopropylamine, di-n-butylamine, dihexylamine, dioctylamine, ethylmethylamine, isopropylmethylamine, n-butylmethylamine, tert-butylmethylamine, isopropylethylamine, n-butylethylamine, tert-butylethylamine, cyclopentylamine, cyclohexylamine, cyclooctylamine, cyclododecylamine, morpholine, piperidine, pyrrolidine, n-methylpiperazine, monoethanolamine, diethanolamine, monopropanolamine, dipropanolamine, methanethiol, ethanethiol, isopropanethiol, n-propanethiol, n-butanethiol, isobutanethiol, sec-butanethiol or tert-butanethiol.

For the preparation of the water-emulsifiable polyisocyanates of the invention the starting components a), b), and d), and also, if appropriate, c), e), and f), are reacted with one another at temperatures of 40 to 180° C., preferably 50 to 150° C., observing an NCO/OH equivalent ratio of 1:1 to 100:1, preferably of 1:1 to 50:1, more preferably 1.5:1 to 30:1.

Reaction takes place in general until the anticipated NCO number to DIN 53185 of preferably at least 3%, more preferably at least 5%, very preferably at least 7%, and in particular 10% by weight has been reached.

The reaction time is generally 10 minutes to 5 hours, preferably 15 minutes to 4 hours, more preferably 20 to 180 minutes, and very preferably 30 to 120 minutes.

In order to accelerate the reaction it is possible, if appropriate, to use suitable catalysts.

Suitable catalysts are the catalysts which are common knowledge for the adduct formation of isocyanate groups (essentially isocyanurates); in other words, for example, the quaternary ammonium hydroxides described in EP-A-649 866, e.g., N,N,N-tri-methyl-N-(2-hydroxypropyl)ammonium hydroxide, or the quaternary ammonium carboxylates known form EP-A-182 203, e.g., N,N,N-trimethyl-N-(2-hydroxypropyl)ammonium 2-ethylhexanoate.

These are the typical catalysts known for urethane formation, examples being metal carboxylates, metal chelates or tertiary amines of the type described in GB-A-0 994 890; alkylating agents of the type described in US-A-3 769 318; or strong acids, as described by way of example in EP-A-0 000 194.

Suitable catalysts are, in particular, zinc compounds, such as zinc(II) stearate, zinc(II) n-octanoate, zinc(II) 2-ethyl-1-hexanoate, zinc(II) naphthenate or zinc(II) acetylacetonate, tin compounds, such as tin(II) n-octanoate, tin(II) 2-ethyl-1-hexanoate, tin(II) laurate, dibutyltin oxide, dibutyltin dichloride, dibutyltin diacetate, dibutyltin dilaurate, dibutyltin dimaleate or dioctyltin diacetate, aluminum tri(ethyl acetoacetate), iron(III) chloride, potassium octoate, compounds of manganese, of cobalt or of nickel, and also strong acids, such as trifluoroacetic acid, sulfuric acid, hydrogen chloride, hydrogen bromide, phosphoric or perchloric acid, for example, or any desired mixtures of these catalysts.

Alternatively use is also made of other organometallic compounds, i.e. those having at least one covalent metal-carbon bond, as catalysts, examples being zirconium bismuth organyls.

For the catalysis of the urethanization it is additionally possible to use alkali metal hydroxides and alkali metal carboxylates, more preferably sodium and potassium hydroxide and carboxylate, very preferably sodium and potassium hydroxide and acetate, and especially potassium hydroxide and potassium acetate.

Depending on the catalyst used it is also possible for allophanate groups to be formed, to varying extents.

The reaction can also take place in the presence of cesium salts, as described in DE 10161156. Preferred cesium salts in this context are compounds in which the following anions are employed: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, with n standing for the numbers 1 to 20.

Preference in this context is given to cesium carboxylates in which the anion conforms to the formulae $(C_nH_{2n-1}O_2)^-$ and also $(C_{n+1}H_{2n-2}O_4)^{2-}$, with n being 1 to 20. Especially preferred cesium salts have monocarboxylate anions of the general formula $(C_nH_{2n-1}O_2)^-$, with n standing for the numbers 1 to 20. Particular mention may be made in this context of formate, acetate, propionate, hexanoate, and 2-ethylhexanoate.

The cesium salts are used in amounts of 0.01 to 10 mmol of cesium salt per kg of solvent-free batch. Preferably they are used in amounts of 0.05 to 2 mmol of cesium salt per kg of solvent-free batch.

The cesium salts can be added to the batch in solid form, but preferably in dissolved form. Suitable solvents are polar, aprotic solvents or else protic solvents.

Suitable, albeit less preferred, catalysts for the process are also those catalysts as described for example in EP-A-0 649 866 page 4 line 7 to page 5 line 15.

Preferred catalysts for the process of the invention are zinc compounds of the abovementioned kind. Very particular preference is given to using zinc(II) n-octanoate, zinc(II) 2-ethyl-1-hexanoate and/or zinc(II) stearate. Very particular preference is given to the use of dibutyltin dilaurate.

These catalysts are employed, if at all, in an amount of 0.001% to 5% by weight, preferably 0.005% to 1% by weight, based on the total weight of the reactants.

Addition to the reaction mixture may take place in this case in accordance with any desired methods. Thus it is possible, for example, to mix the catalyst to be used, if appropriate, either into the polyisocyanate component a) or if appropriate c) and/or into the polyether alcohol d) and/or the component b) before the actual reaction is commenced. It is also possible to add the catalyst to the reaction mixture at any point in time during the reaction or, in the manner of a two-stage reaction regime, following the urethanization, i.e., when the NCO content corresponding theoretically to complete conversion of isocyanate and hydroxyl groups has been reached.

In one preferred embodiment of the present invention polyisocyanates containing allophonate groups and/or urethane groups are obtained at least partly by reaction with hydroxy-functional compounds b) and/or hydroxy-functional compounds d). The allophanate group (calculated as $C_2N_2HO_3=101$ g/mol) content in the case of such polyisocyanates in accordance with the invention is preferably at least 1.5% by weight, more preferably at least 2%, very preferably at least 3%, with very particular preference at least 4%, and in particular at least 5% by weight. In general the allophanate group content is up to 15% by weight, preferably up to 13% by weight.

The polyisocyanates (A) of the invention are obtained by reacting components a), b), and d) with one another.

In this reaction the molar composition a):b):d) per 3 mol of reactive isocyanate groups in a) is generally as follows:
b) 0.1-2.9, preferably 0.2-2.8, and more preferably 0.5-2.5 mol of isocyanate-reactive groups, and
d) 0.05-2.9, preferably 0.07-2.5, more preferably 0.1-2.0, and in particular 0.5-1.5 mol of isocyanate-reactive groups.

The polyisocyanate (A) still comprises, after the reaction of components a), b), and d), free or optionally blocked isocyanate groups; preferably, however, more than 30% of the isocyanate groups present in a) prior to the reaction have undergone reaction, more preferably more than 50%.

In addition it is possible to use at least one further compound containing isocyanate groups, compound c), in amounts of 0 to 15 mol %, based on the NCO groups of component a), preferably 0 to 10, more preferably 0 to 5, and very preferably 0 mol %.

In one preferred embodiment polyisocyanates of the invention may comprise, as further synthesis components e) and/or f), in the following amounts (per mole of reactive isocyanate group in the polyisocyanate (A)):
e) 0-50 mol %, preferably 5-40 mol %, more preferably 10-30 mol %, and in particular 15-25 mol % of isocyanate-reactive groups and/or
f) 0-50 mol %, preferably 5-40 mol %, more preferably 10-30 mol %, and in particular 15-25 mol % of isocyanate-reactive groups.

In one preferred embodiment of the present invention a polyisocyanate (A) of the invention is synthesized from
at least one diisocyanate (a), preferably tolylene diisocyanate, hexamethylene diisocyanate and/or isophorone diisocyanate,
at least one, preferably precisely one, component d), so that the diisocyanate a) and the component d) are reacted to give the diurethane of component a),
followed by a reaction with a polyisocyanate c), which is preferably different than component a), under reaction conditions under which allophanates are formed preferentially, and subsequently
reaction with at least one component b).

In one preferred embodiment the polyisocyanate c) is an isocyanurate, more preferably an isocyanurate of hexamethylene diisocyanate and/or isophorone diisocyanate.

This reaction can also be carried out convergently, by reacting component c) with a substoichiometric amount of component b), to give a polyisocyanate containing urethane groups and containing free isocyanate groups, and then reacting said polyisocyanate with the diurethane obtained from a) and d), under allophanatization conditions.

In a further preferred embodiment of the present invention a polyisocyanate (A) of the invention is synthesized from
at least one diisocyanate (A), hexamethylene diisocyanate and/or isophorone diisocyanate,
at least one, preferably precisely one, component b), so that the diisocyanate a) and the component b) are reacted to give the diurethane of component a),
followed by a reaction with a polyisocyanate c), which is preferably different than component a), under reaction conditions under which allophanates are formed preferentially, and subsequently
reaction with at least one component d).

In one preferred embodiment the polyisocyanate c) is an isocyanurate, more preferably an isocyanurate of hexamethylene diisocyanate and/or isophorone diisocyanate.

In this embodiment as well, in the same way as for the first embodiment, the polyisocyanate (A) can be synthesized convergently.

In a further embodiment the polyisocyanate (A) can be prepared by reacting a diisocyanate a) with a mixture of b) and d) under allophanatization conditions.

In a further embodiment the polyisocyanate (A) can be prepared by reacting a diisocyanate a) and a non-a) polyisocyanate c) with a mixture of b) and d) under allophanatization conditions.

The adducts of compound containing isocyanate groups and the compound comprising groups that are reactive toward isocyanate groups is generally formed by mixing the components in either order, if appropriate at elevated temperature.

Preferably here the compound which comprises groups that are reactive toward isocyanate groups is preferably added to the compound containing isocyanate groups, preferably in two or more steps.

With particular preference the compound containing isocyanate groups is introduced initially and the compounds comprising isocyanate-reactive groups are added. In particular the compound a) containing isocyanate groups is introduced first, then b) and subsequently d) are added, or the compound a) containing isocyanate groups is introduced first, and then d) and subsequently b) are added. After that it is possible to add any further desired components.

It will be appreciated that b) and d) can also be added in a mixture with one another.

In accordance with a further embodiment it is possible to prepare adducts (A1) from a) and b), and also, if appropriate, c), e) and/or f), and adducts (A2) from a) and d), and also, if appropriate, c), e) and/or f), separately from one another and to react the components (A1) and (A2) thus obtainable later with one another, for the purpose, for example, of preparing a coating formulation or dispersion, to form adducts (A), in particular by reaction with compounds e).

In general the reaction is carried out at temperatures between 0 and 150° C., preferably between 20 to 130° C. and more preferably between 25 and 120° C., and in particular between 40 and 100° C.

The reaction is performed generally in bulk, in solution, in dispersion and preferably under atmospheric pressure.

It is preferred in this case to operate under anhydrous conditions. Anhydrous here means that the water content of the reaction system amounts to not more than 5% by weight, preferably not more than 3% by weight, and more preferably not more than 1% by weight.

The reaction is preferably carried out in the presence of at least one suitable inert gas, examples being nitrogen, argon, helium, carbon dioxide or the like.

The reaction can also be carried out in the presence of an inert solvent, examples of which include acetone, isobutyl methyl ketone, ethyl methyl ketone, toluene, xylene, butyl acetate and ethoxyethyl acetate. With preference, however, the reaction is carried out in the absence of a solvent.

The reaction is typically ended when the NCO-reactive groups in the reaction mixture have undergone virtually quantitative reaction.

The NCO content of the polyisocyanates (A) of the invention to DIN 53185 is preferably up to 25% by weight.

The progress of the polyisocyanate formation reaction is appropriately monitored by gel permeation chromatography (GPC) or by determining the NCO content of the reaction mixture.

The reaction is typically ended when the starting compounds that are reactive with isocyanate groups have undergone virtually complete reaction, and in other words are no longer detectable by GPC.

The ending of the reaction takes place, if appropriate, by addition of deactivators. Examples of suitable deactivators include organic or inorganic acids, the corresponding acid halides, and alkylating agents. By way of example mention may be made of phosphoric acid, monochloroacetic acid, dodecylbenzenesulfonic acid, benzoyl chloride, dimethyl sulfate, and, preferably, dibutyl phosphate, and also di-2-ethylhexyl phosphate. The deactivators can be used in amounts of 1 to 200 mol %, preferably 20 to 100 mol %, based on the moles of catalyst.

Particularly preferred polyisocyanates (A) are those having an allophanate content as determinable via gel permeation chromatography of 0.5 to 100 mol %, very preferably 5 to 65 mol %, and in particular 10 to 50 mol %, based on the allophanate molecule with the lowest molecular mass.

In one preferred embodiment of the invention at least one di- or polyisocyanate a) is reacted in a first step with at least one compound b) under reaction conditions under which substantially formation of urethane takes place. The polyisocyanate thus obtained, containing urethane groups, can then be reacted in a second step with the same di- or polyisocyanate a) and/or with another di- or polyisocyanate c) under reaction conditions under which substantially formation of allophanate takes place. The polyisocyanate thus obtained, containing allophanate groups, can then be reacted in a third step with at least one compound d).

Urethanization conditions and allophanatization conditions are frequently the same, so that there is no distinction between the first two reaction steps.

This may be followed by a further reaction with additional components c), e) and/or f).

In a further preferred embodiment of the invention at least one di- or polyisocyanate a) is reacted in a first step with at least one compound d) under reaction conditions under which substantially formation of urethane takes place. The polyisocyanate thus obtained, containing urethane groups, can then be reacted in a second step with the same di- or polyisocyanate a) and/or with another di- or polyisocyanate c) under reaction conditions under which substantially formation of allophanate takes place. The polyisocyanate thus obtained, containing allophanate groups, can then be reacted in a third step with at least one compound b).

Another preferred embodiment of the invention involves reacting a compound a) containing isocyanurate groups with at least one compound b) and at least one compound d). This reaction can selectively be carried out in succession, in other words after the reaction of the compound b) and subsequently with compound d), or first the reaction with the compound d) and subsequently with compound b), or, preferably, in parallel, in other words simultaneous reaction with a mixture of the compounds b) and d).

Compounds particularly suitable for this embodiment according to the invention are compounds containing isocyanurate groups and based on hexamethylenediamine and having an NCO content to DIN EN ISO 11909 of 21.5%-22.5%, a viscosity at 23° C. to DIN EN ISO 3219/A.3 of 2500-4000 mPas and/or an average NCO functionality of 3.0 to 4.0, preferably 3.0 to 3.7, more preferably 3.1 to 3.5. In order that coating compositions based on the reaction products of the invention of such compounds containing isocyanurate groups are highly suitable later on for clearcoat materials, it is further advantageous if the compounds containing isocyanurate groups have a HAZEN/APHA color number to DIN EN 1557 or not more than 40.

Compounds particularly suitable for this embodiment according to the invention are compounds containing biuret groups and based on hexamethylenediamine and having an NCO content to DIN EN ISO 11909 of 22%-24%, a viscosity at 23° C. to DIN EN ISO 3219/A.3 of 1500-6500 mPas and/or an average NCO functionality of 3.0 to 4.0, preferably 3.0 to 3.7, more preferably 3.1 to 3.5. In order that coating compositions based on the reaction products of the invention of such compounds containing biuret groups are highly suitable later on for clearcoat materials, it is further advantageous if the compounds containing biuret groups have a HAZEN/APHA color number to DIN EN 1557 or not more than 40.

Another embodiment of the present invention involves reacting at least one organic di- or polyisocyanate a) with at least one compound b) under urethanization and/or allophanatization conditions and separately therefrom reacting at least one organic di- or polyisocyanate, which is the same or may be a different isocyanate from that reacted with said at least one compound b), with at least one compound d) under urethanization and/or allophanatization conditions. The two modified isocyanates thus obtained can subsequently be reacted, for example, with one another under reaction conditions under which substantially isocyanurate and/or biuret groups are formed, in which case it is possible, if appropriate, to add further di- or polyisocyanate, which may be the same or different than the two di- or polyisocyanates employed, or crosslinked with one another, by means for example of reaction with at least one compound e) having at least two isocyanate-reactive groups, or reacted with one another under allophanatization conditions, it being possible to add, if appropriate, further di- or polyisocyanate, which may be the same or different than the two di- or polyisocyanates employed.

"Urethanization conditions" or "allophanatization conditions" mean here that the reaction conditions selected, through the choice of reactants, catalyst, and temperature, for example, result in formation substantially of urethane groups or allophanate groups, respectively. "Substantially" in this context means that more than 50% of all the groups formed, i.e., isocyanurate, biuret, urethane, allophanate, uretdione, oxadiazinetrione, iminooxadiazinetrione and/or carbodiimide groups, are the desired groups, preferably more than 66%, more preferably more than 75%, and very preferably more than 85%.

Free isocyanate groups present in the product can additionally be blocked, if desired.

The isocyanate groups of the di- or polyisocyanates may also be in capped form. Examples of suitable capping agents for NCO groups include oximes, phenols, imidazoles, pryazoles, pyrazolinones, triazoles, diketopiperazines, caprolactam, malonic esters, or compounds as specified in the publications by Z. W. Wicks, Prog. Org. Coat. 3 (1975), 73-99 and Prog. Org. Coat. 9 (1981), 3-28, by D. A. Wicks and Z. W. Wicks, Prog. Org. Coat. 36 (1999), 148-172 and Prog. Org. Coat. 41 (2001), 1-83, and also in Houben-Weyl, Methoden der Organischen Chemie, Vol. XIV/2, 61 ff. Georg Thieme Verlag, Stuttgart 1963.

By capping agents or blocking agents here are meant compounds which convert isocyanate groups into blocked (capped or protected) isocyanate groups, which then, below what is known as the deblocking temperature, do not exhibit the typical reactions of a free isocyanate group. Compounds of this kind with blocked isocyanate groups are typically employed in dual-cure coating materials or in powder coating materials which are cured to completion via isocyanate group curing.

The polyisocyanates and polyurethane dispersions of the invention can be used with preference as coating compositions. To that end they are admixed with compounds (E) and, if necessary, with the components (C) and, if appropriate, (D).

As photoinitiators (C) it is possible to use photoinitiators known to the skilled worker, examples being those specified in "Advances in Polymer Science", Volume 14, Springer Berlin 1974 or in K. K. Dietliker, Chemistry and Technology of UV— and EB-Formulation for Coatings, Inks and Paints, Volume 3; Photoinitiators for Free Radical and Cationic Polymerization, P. K. T. Oldring (Ed.), SITA Technology Ltd, London.

Suitable examples include phosphine oxides, benzophenones, α-hydroxyalkyl aryl ketones, thioxanthones, anthraquinones, acetophenones, benzoins and benzoin ethers, ketals, imidazoles or phenylglyoxylic acids, and mixtures thereof.

Phosphine oxides are, for example, mono- or bisacylphosphine oxides, such as Irgacure® 819 (bis(2,4,6-trimethylbenzoyl)phenylphosphine oxide), as are described for example in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO), ethyl 2,4,6-trimethylbenzoylphenylphosphinate or bis(2,6-dimethoxybenzoyl)-2,4,4-trimethylpentylphosphine oxide;

benzophenones are, for example, benzophenone, 4-aminobenzophenone, 4,4'-bis(dimethylamino)benzophenone, 4-phenylbenzophenone, 4-chlorobenzophenone, Michler's ketone, o-methoxybenzophenone, 2,4,6-trimethylbenzophenone, 4-methylbenzophenone, 2,4-dimethylbenzophenone, 4-isopropylbenzophenone, 2-chlorobenzophenone, 2,2'-dichlorobenzophenone, 4-methoxybenzophenone, 4-propoxybenzophenone or 4-butoxybenzophenone;

α-hydroxyalkyl aryl ketones are, for example, 1-benzoylcyclohexan-1-ol (1-hydroxycyclohexyl phenyl ketone), 2-hydroxy-2,2-dimethylacetophenone (2-hydroxy-2-methyl-1-phenylpropan-1-one), 1-hydroxyacetophenone, 1-[4-(2-hydroxyethoxy)phenyl]-2-hydroxy-2-methyl-1-propan-1-one or polymer comprising 2-hydroxy-2-methyl-1-(4-isopropen-2-ylphenyl)propan-1-one in copolymerized form (Esacure® KIP 150);

xanthone and thioxanthones are, for example, 10-thioxanthenone, thioxanthen-9-one, xanthen-9-one, 2,4-dimethylthioxanthone, 2,4-diethylthioxanthone, 2,4-diisopropylthioxanthone, 2,4-dichlorothioxanthone or chloroxanthenone, anthraquinones are, for example, β-methylanthraquinone, tert-butylanthraquinone, anthraquinonecarbonyl acid esters, benz[de]anthracene-7-one, benz[α]anthracene-7,12-dione, 2-methylanthraquinone, 2-ethylanthraquinone, 2-tert-butylanthraquinone, 1-chloroanthraquinone or 2-amylanthraquinone;

acetophenones are, for example, acetophenone, acetonaphthoquinone, valerophenone, hexanophenone, α-phenylbutyrophenone, p-morpholinopropiophenone, dibenzosuberone, 4-morpholinobenzophenone, p-diacetylbenzene, 4'-methoxyacetophenone, α-tetralone, 9-acetylphenanthrene, 2-acetylphenanthrene, 3-acetylphenanthrene, 3-acetylindole, 9-fluorenone, 1-indanone, 1,3,4-triacetylbenzene, 1-acetonaphthone, 2-acetonaphthone, 2,2-dimethoxy-2-phenylacetophenone, 2,2-diethoxy-2-phenylacetophenone, 1,1-dichloroacetophenone, 1-hydroxyacetophenone, 2,2-diethoxyacetophenone, 2-methyl-1-[4-(methylthio)phenyl]-2-morpholinopropan-1-one, 2,2-dimethoxy-1,2-diphenylethan-2-one or 2-benzyl-2-dimethylamino-1-(4-morpholinophenyl)butan-1-one;

benzoins and benzoin ethers are, for example, 4-morpholinodeoxybenzoin, benzoin, benzoin isobutyl ether, benzoin tetrahydropyranyl ether, benzoin methyl ether, benzoin ethyl ether, benzoin butyl ether, benzoin isopropyl ether or 7H-benzoin methyl ether; or ketals are, for example, acetophenone dimethyl ketal, 2,2-diethoxyacetophenone, or benzil ketals, such as benzil dimethyl ketal.

Phenylglyoxylic acids are described for example in DE-A 198 26 712, DE-A 199 13 353 or WO 98/33761.

Photoinitiators which can be used in addition are, for example, benzaldehyde, methyl ethyl ketone, 1-naphthaldehyde, triphenylphosphine, tri-o-tolylphosphine or 2,3-butanedione.

Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone, or 2,4,6-trimethylbenzophenone and 4-methylbenzophenone and 2,4,6-trimethylbenzoyldiphenylphosphine oxide.

In addition, or instead of the photoinitiators, it is possible to add one or more thermally activable initiators, examples being potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and also, for example, thermally activable initiators which have a half-life at 80° C. of more than 100 hours, such as di-tert-butyl peroxide, cumene hydroperoxide, dicumyl peroxide, tert-butyl perbenzoate, silylated pinacols, which are available commercially under the trade name ADDID 600 from Wacker, for example, or hydroxyl-containing amine N-oxides, such as 2,2,6,6-tetramethylpiperidine-N-oxyl, 4-hydroxy-2,2,6,6-tetramethylpiperidine-N-oxyl, etc.

Further examples of suitable initiators are described in "Polymer Handbook", 2nd ed., Wiley & Sons, New York.

Furthermore, it is also possible to use cerium(IV) compounds as initiators.

Cerium(IV) compounds in this sense are compounds which comprise at least one $Ce^{4+}$ cation with any desired counterions.

Suitable counterions include $F^-$, $Cl^-$, $ClO^-$, $ClO_3^-$, $ClO_4^-$, $Br^-$, $I^-$, $IO_3^-$, $CN^-$, $OCN^-$, $SCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, dithiocarbamate, salicylate, $(OC_pH_{2p+1})^-$, $(C_pH_{2p-1}O_2)^-$, $(C_pH_{2p-3}O_2)^-$, and $(C_{p+1}H_{2p-2}O_4)^{2-}$, in which p stands for the numbers 1 to 20, methanesulfonate ($CH_3SO_3^-$), trifluoromethanesulfonate ($CF_3SO_3^-$), toluenesulfonate ($CH_3C_6H_4SO_3^-$), benzensulfonate ($C_6H_5SO_3^-$), hydroxide ($OH^-$), anions of aromatic acids such as benzoic acid, phthalic acid, and the like, and 1,3-dicarbonyl compounds.

Mention may additionally be made of carboxylates, especially formate, acetate, propionate, hexanoate, and 2-ethylhexanoate, and also oxalate, acetylacetonate, acrylate, and methacrylate, preferably formate, acetate, propionate, oxalate, acetylacetonate, acrylate, and methacrylate.

These salts may also be in the form of hydrates, which are equally suitable.

Preferred cerium(IV) compounds are ammonium hexanitratocerate(IV) (cerium(IV) ammonium nitrate, $(NH_4)_2[Ce(NO_3)_6]$), sodium hexanitratocerate(IV) ($Na_2\text{-}[Ce(NO_3)_6]$), potassium hexanitratocerate(IV) ($K_2[Ce(NO_3)_6]$), cerium (IV) ammonium sulfate ($Ce(NH_4)_2(NO_3)_6$)), cerium(IV) hydroxide, cerium(IV) isopropoxide/isopropanol complex, cerium(IV) oxide ($CeO_2$) and cerium(IV) sulfate ($Ce(SO_4)_2$).

It will be appreciated that it is also possible to use compounds of cerium in a lower oxidation state, and to convert them within the coating composition, using an oxidizing agent, into a cerium(IV) compound; particularly cerium(III) compounds.

Preferred cerium(III) compounds are cerium(III) acetate, cerium(III) acetate hydrate, cerium(III) acetylacetonate-hydrate, cerium(III) bromide, cerium(III) carbonate, cerium (III) carbonate hydrate, cerium(III) chloride ($CeCl_3$), cerium (III) chloride hepta-hydrate, cerium(III) ethylhexanoate and its solutions or dispersions in mineral oil or naphtha (Octa Soligen Cerium® 6 and 10 from Borcherts, Monheim, Germany, CAS number [58797-01-4]), cerium(III) fluoride, cerium(III) nitrate ($Ce(NO_3)_3$), cerium(III) nitratehexahydrate, cerium(III) oxalate, cerium(III) sulfate, cerium(III) sulfate octahydrate, cerium(III) oxide or cerium(III) acrylate.

Oxidizing agents suitable in this context include, in accordance with the invention, those which do not in turn trigger a polymerization, i.e., which are not free-radical initiators.

It is, however, preferred to employ the cerium compounds as cerium(IV) compounds.

The cerium compounds can also be used in the form of complexes, complexed for example with amine-, sulfur-, nitrogen-, phosphorus- and/or oxygen-containing ligands, or in the form of cyclopentadienyl complexes. Examples of ligands are mercaptans, sulfides, primary, secondary or tertiary amines, primary, secondary or tertiary phosphines, alcohols, and ethers, and also cyclopentadiene, benzene, furan, pyrrole, pyridine, and thiophene, and also derivatives thereof, and also complexing agents such as ethanolamines, ethylenediaminetetraacetate, ethylenediaminetriacetate, nitrilotriacetic acid, and the like.

As further, typical coatings additives (D) it is possible to make use for example of antioxidants, stabilizers, activators (accelerants), fillers, pigments, dyes, antistats, flame retardants, thickeners, thixotropic agents, surface-active agents, viscosity modifiers, plasticizers or chelating agents.

As accelerants for the thermal aftercure it is possible make use for example of tin octoate, zinc octoate, dibutyltin laurate or diazabicyclo[2.2.2]octane.

Suitable thickeners, besides free-radically (co)polymerized (co)polymers, include typical organic and inorganic thickeners such as hydroxymethylcellulose or bentonite.

Examples of chelating agents which can be used include ethylenediamine acetic acid and its salts, and also β-diketones.

Suitable fillers comprise silicates, examples being silicates obtainable by hydrolysis of silicon tetrachloride, such as Aerosil® from Degussa, siliceous earth, talc, aluminum silicates, magnesium silicates, and calcium carbonates, etc.

Suitable stabilizers comprise typical UV absorbers such as oxanilides, triazines, and benzotriazole (the latter obtainable as Tinuvin® grades from Ciba-Spezialitätenchemie), and benzophenones. These can be used alone or together with suitable free-radical scavengers, examples being sterically hindered amines such as 2,2,6,6-tetramethylpiperidine, 2,6-di-tert-butylpiperidine or derivatives thereof, such as bis(2,2,6,6-tetramethyl-4-piperidyl) sebacate. Stabilizers are typically used in amounts of 0.1% to 5.0% by weight, based on the solid components present in the preparation.

Based on the overall weight it is possible for the ready-prepared polyurethane dispersion to comprise 0-10% by weight of (C), preferably 1-8% by weight, more preferably 2-7% by weight, and in particular 3-5% by weight, and also based on the overall weight it is possible for the ready-prepared dispersion to comprise 0-50% by weight of components (D), preferably 5-40%, more preferably 10-30%, and in particular 15-25% by weight.

Binders which can be used as reactants (E) for the water-dispersible polyisocyanates of the invention containing free isocyanate groups are those which have isocyanate-reactive groups.

Examples of such binders are polyacrylate polyols, polyester polyols, polyether polyols, polyurethane polyols; polyurea polyols; polyester polyacrylate polyols; polyester polyurethane polyols; polyurethane polyacrylate polyols, polyurethane-modified alkyd resins; fatty acid-modified polyester polyurethane polyols, copolymers with allyl ethers, graft polymers from the stated classes of compound with, for example, different glass transition temperatures, and also mixtures of said binders. Thos preferred are polyacrylate polyols, polyester polyols, and polyether polyols. In addition it is also possible to add melamine-formaldehyde resins.

In the context of the invention it is preferred to use polyacrylate polyols, polyesterols and/or polyetherols, especially having a molecular weight $M_n$ of at least 1000 g/mol.

The polyacrylate polyols are, for example, those which comprise hydroxyl-carrying monomers in copolymerized form, examples being those as listed above under b), preferably 2-hydroxyethyl acrylate, 2-hydroxyethyl methacrylate, 2- or 3-hydroxypropyl acrylate, 1,4-butanediol monoacrylate or 3-(acryloyloxy)-2-hydroxypropyl acrylate, and more preferably 2-hydroxyethyl acrylate and/or 2-hydroxyethyl methacrylate, usually as a mixture with other polymerizable monomers, preferably free-radically polymerizable monomers, preferably those which are composed to an extent of more than 50% by weight of $C_1$-$C_{20}$ alkyl(meth)acrylate, vinylaromatics having up to 20 carbon atoms, vinyl esters of carboxylic acids comprising up to 20 carbon atoms, vinyl halides, nonaromatic hydrocarbons having 4 to 8 carbon atoms and 1 or 2 double bonds, unsaturated nitriles, and mixtures thereof. Particular preference is given to the polymers composed to the extent of more than 60% by weight of $C_1$-$C_{10}$ alkyl (meth)acrylates, styrene or mixtures thereof.

In addition the polymers may comprise hydroxy-functional monomers corresponding to the above hydroxyl group content, and, if appropriate, further monomers, examples being ethylenically unsaturated acids, especially carboxylic acids, acid anhydrides or acid amides.

Further polymers are, for example, polyesterols, as are obtainable by condensing polycarboxylic acids, especially dicarboxylic acids, with polyols, especially diols.

Polyester polyols are known for example from Ullmanns Encyklopädie der technischen Chemie, 4th edition, Volume 19, pp. 62 to 65. It is preferred to use polyester polyols obtained by reacting dihydric alcohols with dibasic carboxylic acids. In lieu of the free polycarboxylic acids it is also possible to use the corresponding polycarboxylic anhydrides or corresponding polycarboxylic esters of lower alcohols, or mixtures thereof, for preparing the polyester polyols. The polycarboxylic acids may be aliphatic, cycloaliphatic, araliphatic, aromatic or heterocyclic and may if appropriate be substituted, by halogen atoms for example, and/or unsaturated. Examples that may be mentioned of such acids include the following:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexane dicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, $C_1$-$C_4$ alkyl esters for example, preferably methyl, ethyl or n-butyl esters, of the acids stated are used. Preference is given to dicarboxylic acids of the general formula $HOOC-(CH_2)_y-COOH$, wherein y is a number from 1 to 20, preferably an even number from 2 to 20, particular preference to succinic acid, adipic acid, sebacic acid, and dodecanedicarboxylic acid.

Suitable polyhydric alcohols for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, poly THF having a molar mass between 162 and 2000, poly-1,3-propanediol having a molar mass between 134 and 1178, poly-1,2-propanediol having a molar mass between 134 and 898, polyethylene glycol having a molar mass between 106 and 458, neopentyl glycol, neopentyl glycol hydroxypivalate, 2-ethyl-1,3-propanediol, 2-methyl-1,3-propanediol, 2,2-bis(4-hydroxycyclohexyl)propane, 1,1-, 1,2-, 1,3- and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, and isomalt, which, if appropriate, may have been alkoxylated as described above.

Preference is given to alcohols of the general formula $HO-(CH_2)_x-OH$, wherein x is a number from 1 to 20, preferably an even number from 2 to 20. Preferred alcohols are ethylene glycol, butane-1,4-diol, hexane-1,6-diol, octane-1,8-diol and dodecane-1,12-diol. Additionally preferred is neopentyl glycol.

Also suitable, furthermore, are polycarbonate diols, such as may be obtained, for example, by reacting phosgene with an excess of the low molecular mass alcohols specified as synthesis components for the polyester polyols.

Also suitable are lactone-based polyester diols, which are homopolymers or copolymers of lactones, preferably hydroxyl-terminated adducts of lactones with suitable difunctional starter molecules. Suitable lactones are preferably those derived from compounds of the general formula $HO-(CH_2)_z-COOH$, wherein z is a number from 1 to 20 and one hydrogen atom of a methylene unit may also be substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components include the low molecular mass, dihydric alcohols specified above as a synthesis component for the polyester polyols. The corresponding polymers of ε-caprolactone are particularly preferred. Lower polyester diols or polyether diols as well can be used as starters for preparing the lactone polymers. In lieu of the polymers of lactones it is also possible to use the corresponding, chemically equivalent polycondensates of the hydroxycarboxylic acids corresponding to the lactones.

Also suitable as polymers, furthermore, are polyetherols, which are prepared by addition reaction of ethylene oxide, propylene oxide or butylene oxide with H-active components. Polycondensates of butanediol are also suitable.

The polymers can of course also be compounds having primary or secondary amino groups.

In one particularly preferred embodiment the polyol components are in the form of dispersions, such as primary or secondary dispersions, for example. Polyol components of this kind, present in dispersion, can for example be those as described in DE-A1 42 06 044, page 3 line 1 to page 4 line 30, hereby expressly incorporated by reference.

The molar masses are not subject in principle to any restriction.

Such polyacrylate polyols, polyesterols and/or polyetherols have a molecular weight $M_n$ in secondary dispersions of preferably at least 500, more preferably at least 1000, very preferably at least 2000. The molecular weight $M_n$ can amount, for example, to up to 200 000, preferably up to 100 000, more preferably up to 80 000, and very preferably up to 50 000 g/mol. In the case of acrylate dispersions $M_n$ can also amount to up to 1 000 000.

In the case of primary dispersions of a polymer of olefinically unsaturated monomers, such as polyacrylates, the molecular weight can amount for example to up to 1 500 000 g/mol, preferably not above 1 000 000 g/mol, with particular preference not above 500 000 g/mol.

The dispersions are rendered dispersible for example with ionic groups or with groups which can be converted into ionic groups. Preference is given to carboxylic acid and/or sulfonic acid and, respectively, carboxylate and/or sulfonate groups.

The dispersions of the polyisocyanates of the invention and of the stated binders can be neutralized, preferably with amines, more preferably with dimethylethanolamine; triethylamine; ethyldiisopropylamine, aminomethylpropanol or ammonia. Ammonia is particularly preferred in the case of primary dispersions.

It is possible if appropriate, moreover, for at least one compound (F) having at least one, preferably precisely one, isocyanate-reactive group and at least one free-radically polymerizable unsaturated group.

The components (F) preferably have a molar weight of below 10 000 g/mol, more preferably below 5000 g/mol, very preferably below 4000 g/mol, and in particular below 3000 g/mol. Specific compounds (F) have a molar weight below 1000 or even below 600 g/mol.

Components (F) can be, for example, monoesters of α,β-unsaturated carboxylic acids, such as acrylic acid, methacrylic acid, crotonic acid, itaconic acid, fumaric acid, maleic acid, acrylamidoglycolic acid, methacrylamidoglycolic acid or vinyl ethers with diols or polyols which have preferably 2 to 20 carbon atoms and at least two hydroxyl groups, such as ethylene glycol, diethylene glycol, triethylene glycol, propylene 1,2-glycol, propylene 1,3-glycol, 1,1-dimethyl-1,2-ethanediol, dipropylene glycol, triethylene glycol, tetraethylene glycol, pentaethylene glycol, tripropylene glycol, 1,2-, 1,3- or 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, poly THF having a molar weight between 162 and 2000, poly-1,3-propanediol having a molar weight between 134 and 400 or polyethylene glycol having a molar weight between 238 and 458. In addition it is also possible to use esters or amides of (meth)acrylic acid with amino alcohols, such as 2-aminoethanol, 2-(methylamino)ethanol, 3-amino-1-propanol, 1-amino-2-propanol or 2-(2-aminoethoxy)ethanol, 2-mercaptoethanol, or polyamino alkanes, such as ethylenediamine or diethylenetriamine, or vinylacetic acid.

Preference is given to using 2-hydroxyethyl(meth)acrylate, 2- or 3-hydroxyropyl (meth)acrylate, 1,4-butanediol mono(meth)acrylate, neopentyl glycol mono(meth)acrylate, 1,5-pentanediol mono(methacrylate), 1,6-hexanediol mono (methacrylate), glycerol mono- and di(meth)acrylate, trimethylolpropane mono- and di(meth)acrylate, pentaerythritol mono-, di-, and tri(meth)acrylate, and also 4-hydroxybutyl vinyl ether, 2-aminoethyl(meth)acrylate, 2-aminopropyl (meth)acrylate, 3-aminoproyl(meth)acrylate, 4-aminobutyl (meth)acrylate, 6-aminohexyl (meth)acrylate, 2-thioethyl (meth)acrylate, 2-aminoethyl(meth)acrylamide, 2-aminopropyl(meth)acrylamide, 3-aminopropyl(meth) acrylamide, 2-hydroxyethyl (meth)acrylamide, 2-hydroxypropyl(meth)acrylamide or 3-hydroxypropyl (meth)acrylamide. Particular preference is given to 2-hydroxyethyl acrylate, 2-hydroxyethyl methacrylate, 2- or 3-hydroxypropyl acrylate, 1,4-butanediol monoacrylate, 3-(acryloyloxy)-2-hydroxypropyl(meth)acrylate, and the monoacrylates of polyethylene glycol with a molar mass of 106 to 238.

The coating of the substrates with the coating compositions of the invention takes place in accordance with typical methods known to the skilled worker, where at least one dispersion of the invention or coating formulation of the invention is applied to the target substrate in the desired thickness, and the volatile constituents of the dispersions are removed, with heating if appropriate. This operation can be repeated one or more times if desired. Application to the substrate may take place in a known way, by means, for example, of spraying, troweling, knifecoating, brushing, rolling, roller coating, pouring, laminating, injection back molding or coextruding. The coating thickness is generally in a range from about 3 to 1000 g/m² and preferably 10 to 200 g/m².

Additionally disclosed is a method of coating substrates which comprises adding, if appropriate, further, typical coatings additives and thermally curable resins to the polyisocyanate of the invention, in the form for example of polyurethane dispersions, coating compositions or coating formulations, applying the resulting composition to the substrate, and drying it if appropriate, curing it with electron beams or UV exposure under an oxygen-containing atmosphere or, preferably, under inert gas, and subjecting it to thermal treatment if appropriate at temperatures up to the level of the drying temperature and subsequently at temperatures up to 160° C., preferably between 60 and 160° C.

The method of coating substrates can also be implemented by first applying the polyisocyanates of the invention in the form, for example, of polyurethane dispersions, coating compositions or coating formulations and then subjecting the applied films to thermal treatment first at temperatures up to 160° C., preferably between 60 and 160° C., and then to curing with electron beams or UV exposure under oxygen or, preferably, under inert gas.

Curing of the films formed on the substrate may if desired take place exclusively by thermal means. In general, however, the coatings are cured not only by exposure to high-energy radiation but also thermally.

Curing may also take place, in addition to or instead of the thermal curing, by means of NIR radiation, which here refers to electromagnetic radiation in the wavelength range from 760 nm to 2.5 µm, preferably from 900 to 1500 nm.

If appropriate, if two or more films of the coating material are applied one above another, it is possible for an NIR, thermal and/or radiation cure to take place after each coating operation.

Examples of suitable radiation sources for the radiation cure are low-pressure, medium-pressure or high-pressure mercury lamps and also fluorescent tubes, pulsed lamps, metal halide lamps, electronic flash installations, which enable radiation curing without a photoinitiator, or excimer emitters. The radiation cure is accomplished by exposure to high-energy radiation, in other words UV radiation, or daylight, preferably light in the wavelength range from $\lambda=200$ to 700 nm, more preferably from $\lambda=200$ to 500 nm, and very preferably $\lambda=250$ to 400 nm, or by bombardment with high-energy electrons (electron beams; 150 to 300 keV). Examples of radiation sources used include high-pressure mercury vapor lamps, lasers, pulsed lamps (flash light), halogen lamps or excimer emitters. The radiation dose typically sufficient for crosslinking in the case of UV curing is situated in a range from 80 to 3000 mJ/cm².

It will be appreciated that two or more radiation sources can also be used for the cure, two to four for example.

These sources may also emit each in different wavelength ranges.

Irradiation can, if appropriate, also be carried out in the absence of oxygen, such as under an inert gas atmosphere. Suitable inert gases include, preferably, nitrogen, noble gases, carbon dioxide or combustion gases. In addition irradiation may take place with the coating composition covered by transparent media. Examples of transparent media include polymeric films, glass or liquids, water for example. Particular preference is given to irradiation in the manner described in DE-A 199 57 900.

The invention further provides a method of coating substrates which comprises
i) coating a substrate with a coating formulation or dispersion as described above,
ii) removing volatile constituents of the coating formulation or dispersion in order to form a film, under conditions in which the initiator (C) as yet substantially forms no free radicals,
iii) if appropriate, subjecting the film formed in step ii) to high-energy irradiation, in the course of which the film is precured, and subsequently, if appropriate, machining the article coated with the precured film, or contacting the surface of the precured film of another substrate,
iv) subjecting the film to a final thermal cure.

Steps iv) and iii) may also be carried out in reverse order, i.e., the film can be cured first thermally and then with high-energy radiation.

The polyisocyanates, coating compositions, and coating formulations of the invention are particularly suitable for coating substrates such as wood, paper, textile, leather, nonwoven, surfaces of plastics, glass, ceramic, mineral building materials, such as cement moldings and fiber-cement slabs, or coated or uncoated metals, preferably plastics or metals, in particular in the form of films, sheets or foils.

The polyisocyanates, coating formulations or dispersions of the invention are suitable as or in exterior coatings, i.e., in those applications where they are exposed to the daylight, preferably on buildings or parts of buildings, interior coatings, traffic markings, and coatings on vehicles and aircraft. In particular the coating formulations or dispersions of the invention are used as or in automotive clearcoat and topcoat material(s).

In particular they are suitable for use as primers, surfacers, pigmented topcoat materials, and clearcoat materials in industrial coating, especially aircraft or large-vehicle coating, wood coating, automotive finishing, especially OEM finishing or refinish, or decorative coating. The coating materials are especially suitable for applications requiring particularly high application reliability, exterior weathering resistance, optical qualities, solvent resistance and/or chemical resistance.

The examples which follow are intended to illustrate the properties of the invention, but without restricting it.

EXAMPLES

"Parts" in this specification, unless indicated otherwise, are to be understood as being parts by weight.

Viscosities in this specification are reported in accordance with DIN EN ISO 3219/A.3. Unless indicated otherwise the measurement is made at 23° C.

Polyether A:

Monofunctional polyethylene oxide prepared starting from methanol with potassium hydroxide catalysis, having an OH number of 112, measured to DIN 53 240, corresponding to a molecular weight of 500 g/mol. The residues of catalyst still present was subsequently neutralized with acetic acid. The basicity is determined by titration with hydrochloric acid to be 10.6 mmol/kg. The polyether alcohol thus obtained was then adjusted further with para-toluenesulfonic acid to a basicity of 2 mmol/kg.

Polyether B:

Monofunctional polyethylene oxide prepared starting from methanol with potassium hydroxide catalysis, having an OH number of 112, measured to DIN 53 240, corresponding to a molecular weight of 500 g/mol. The residues of catalyst still present were subsequently neutralized with acetic acid and the product was desalified. In the course of the desalification, potassium acetate formed is removed as well.

Polyisocyanate A:

A water-dispersible isocyanurate based on hexamethylene 1,6-diisocyanate was prepared by the method of Example 2 from WO 2005/047357: an isomer mixture of 80 parts tolylene 2,4-diisocyanate and 20 parts tolylene 2,6-diisocyanate was reacted completely with polyether A, i.e., to an NCO content of 0% by weight. Reaction of this precursor with the isocyanurate of hexamethylene 1,6-diisocyanate gave a water-dispersible polyisocyanate having an NCO content of 17.2% by weight and a viscosity at 23° C. of 4000 mPa*s.

Polyisocyanate B:

In a reaction vessel equipped with stirrer and thermometer, 850 g of a commercial biuret of hexamethylene 1,6-diisocyanate (Basonat® HB 100 from BASF AG), having an NCO content of 21.5%, were mixed with 151.5 g of polyether A at room temperature and then this mixture was reacted over the course of 6.5 h at 60° C. to give a readily water-dispersible product having an NCO content of 17.0% and a viscosity at 23° C. of 3300 mPa*s.

Polyisocyanate C:

In a reaction vessel with stirrer and thermometer, 237.5 g of a commercial HDI isocyanurate (Basonat® HI 100 from BASF AG), having an NCO content of 22.2%, were admixed with 12.5 g of (3-cyclohexylamino)propanesulfonic acid and 7.25 g of dimethylcyclohexylamine at room temperature. After the components had been thoroughly mixed, reaction was carried out at 80° C. for 5 hours. The readily water-dispersible product had an NCO content of 19.6% and a viscosity of 12 500 mPa*s.

Example 1

In a reaction vessel provided with stirrer, thermometer, and reflux condenser, 300 g of polyisocyanate A, having an NCO content of 17.2%, with 0.15 g of 4-methoxyphenol and 0.3 g of Kerobit® TBK (2,6-di-tert-butyl-p-cresol from Raschig) (as stabilizers) were mixed with 25.7 g of 2-hydroxyethyl acrylate. When about 0.15 g of dibutyltin dilaurate catalyst was added an increase in the internal temperature was observed to approximately 45° C. At this point reaction was continued at 60° C. for 2 hours. Thereafter the batch is readily dispersible in water. The NCO content of the product was 12.9%, its viscosity (23° C.) 13 300 mPas.

Example 2

In a reaction vessel provided with stirrer, thermometer, and reflux condenser, 300 g of polyisocyanate A, with 0.15 g of 4-methoxyphenol and 0.3 g of Kerobit® TBK (2,6-di-tert-butyl-p-cresol from Raschig) (as stabilizers) were reacted in the same way as in Example 1, with dibutyltin dilaurate catalysis with 15 g of 2-hydroxyethyl acrylate at 60° C. for 2 hours. The batch thereafter is readily dispersible in water. The NCO content of the product was 15.1%, its viscosity 8100 mPas.

Example 3

In a reaction vessel provided with stirrer, thermometer, and reflux condenser, 300 g of polyisocyanate B, with 0.3 g of 4-methoxyphenol and 0.3 g of diphenylethene (as stabilizers) were reacted in the same way as in Example 1, with dibutyltin dilaurate catalysis with 28.8 g of 2-hydroxyethyl acrylate at 60° C. for 2 hours. The batch thereafter is readily dispersible in water. The NCO content of the product was 12.2%, its viscosity 13 900 mPas.

Example 4

In a reaction vessel provided with stirrer, thermometer, and reflux condenser, 500 g of a commercial HDI isocyanurate (Basonat® HI 100 from BASF AG, NCO content 21.7%) with 0.5 g of 4-methoxyphenol and 0.5 g of diphenylethene (as stabilizers) were mixed with 45.2 g of 2-hydroxyethyl acrylate and 60 g of polyether B. When dibutyltin dilaurate catalyst is added there is an exothermic reaction, combined with a temperature increase to approximately 48° C. The reaction was subsequently continued at 55° C. for 30 minutes. The batch thereafter is readily dispersible in water. The NCO content of the product was 14.4%, its viscosity 11 600 mPas at 23° C.

Example 5

In the same way as in Example 4, in a reaction vessel provided with stirrer, thermometer, and reflux condenser, 300 g of a commercial HDI biuret (Basonat® HB 100 from BASF AG, NCO content 21.1%) with 0.3 g of 4-methoxyphenol and 0.3 g of diphenylethene (as stabilizers) were reacted, under dibutyltin dilaurate catalysis, with 27.1 g of 2-hydroxyethyl acrylate and 36 g of polyether B at 80° C. for 4 hours. The batch thereafter is readily dispersible in water. The NCO content of the product was 13.85%, its viscosity (23° C.) 13 100 mPas.

Example 6

In a reaction vessel provided with stirrer, thermometer, and reflux condenser, 500 g of a commercial HDI isocyanurate (Basonat® HI 100 from BASF AG, NCO content 21.7%) with 0.5 g of 4-methoxyphenol and 0.5 g of diphenylethene (as stabilizers) were admixed with 45.2 g of 2-hydroxyethyl acrylate. When dibutyltin dilaurate catalyst is added there is an exothermic reaction, combined with a temperature increase to approximately 40° C. The reaction was subsequently continued at 55° C. for 30 minutes. Thereafter 60 g of polyether B were added, again with heat being evolved and an increase in the temperature of the batch to approximately 65° C. After a reaction time at 65° C. of 30 minutes the water-dispersibility of the product was very good. The NCO content of the product was 14.2%, its viscosity 11 500 mPas at 23° C.

Example 7

In the same way as in Example 1, in a reaction vessel provided with stirrer, thermometer, and reflux condenser, 100 g of polyisocyanate C with 0.05 g of 4-methoxyphenol and 0.1 g of Kerobit® TBK (2,6-di-tert-butyl-p-cresol from Raschig) (as stabilizers) were reacted, under dibutyltin dilaurate catalysis, with 8.6 g of 2-hydroxyethyl acrylate at 60° C. for 2 hours. The batch thereafter was readily dispersible in water. The NCO content of the product was 15.05%, its viscosity (at 23° C.) 42 000 mPa*s.

The invention claimed is:

1. A water-emulsifiable, radiation-curable polyisocyanate (A), comprising as synthesis components:
   a) at least one organic di- or polyisocyanate;
   b) at least one compound having at least one isocyanate-reactive group and at least one selected from the group consisting of a free-radically polymerizable unsaturated group, a cationically polymerizable group and both a free-radically polymerizable unsaturated group and a cationically polymerizable group;
   c) optionally, at least one further organic di- or polyisocyanate, different than a)
   d) at least one compound having precisely one isocyanate-reactive group and at least one saturated dispersive group,
   e) optionally, at least one compound having at least two isocyanate-reactive groups, and
   f) optionally, compounds different than a) to d) and having at least one isocyanate-reactive group,
   with the proviso that compounds comprising capped amino groups, carbamate end groups and/or urea end groups in combination with anionic dispersive compounds are excluded as synthesis components, and
   wherein the isocyanate content, calculated as NCO with the molecular weight 42 g/mol, is at least 3% by weight and up to 25% by weight, and
   the free-radically polymerizable unsaturated group and cationically polymerizable group are optionally substituted acryloyl groups or optionally substituted vinyl ether groups.

2. The polyisocyanate according to claim 1, wherefrom compounds carrying capped amino groups, carbamate end groups and/or urea end groups in combination with cationic dispersive compounds are excluded as synthesis components.

3. The polyisocyanate according to claim 1, wherefrom compounds carrying capped amino groups, carbamate end groups and/or urea end groups are excluded as synthesis components.

4. The polyisocyanate according to claim 1, wherein the compound d) having at least one saturated dispersive group is a compound d1) comprising at least one anionic group or group which can be converted into an anionic group, or is a compound d3) comprising at least one nonionic group.

5. The polyisocyanate according to claim 4, wherein the compound d3) is a polyalkylene oxide polyether alcohol obtained by reacting at least one saturated aliphatic or cycloaliphatic alcohol with at least one selected from the group of oxides consisting of ethylene oxide, propylene oxide, isobutylene oxide, vinyloxirane and styrene oxide.

6. The polyisocyanate according to claim 5, wherein the compound d3) is a monohydric polyalkylene oxide polyether alcohol which comprises 5 to 50 ethylene oxide units.

7. The polyisocyanate according to claim 4, wherein the compound d1) is N-cyclohexylaminoethanesulfonic acid or N-cyclohexylaminopropanesulfonic acid.

8. The polyisocyanate according to claim 1, wherein an allophanate group, calculated as $C_2N_2HO_3=101$ g/mol, content is at least 1.5% by weight.

9. A coating composition comprising
   (A) a polyisocyanate according to claim 1,
   (C) optionally, one or more photochemically and/or thermally activable initiators,
   (D) optionally, further, typical coatings additives,
   (E) at least one compound having more than two isocyanate-reactive groups (binder), and
   (F) optionally, at least one compound having one or more than one free-radically polymerizable double bond.

10. The coating composition according to claim 9, wherein said binder (E) is selected from the group consisting of polyacrylate polyols, polyester polyols, polyether polyols, polyurethane polyols; polyurea polyols; polyester polyacrylate polyols; polyester polyurethane polyols; polyurethane polyacrylate polyols, polyurethane-modified alkyd resins; fatty acid-modified polyester polyurethane polyols, copolymers with allyl ethers and graft polymers from the stated classes of compound.

11. A process for preparing a water-emulsifiable, radiation-curable polyisocyanate, which comprises reacting at least one diisocyanate a) in a first step with at least one compound d) under reaction conditions under which substantially formation of urethane takes place to give the diurethane, subsequently reacting the resultant diurethane in a second step with the same di- or polyisocyanate a) and/or a different di- or polyisocyanate c) under reaction conditions under which substantially formation of allophanate takes place, and then reacting the resultant allophanate-functional polyisocyanate in a third step with at least one compound b), wherein a), b), c), and d) have the same definition as in claim 1.

12. A process for preparing a water-emulsifiable, radiation-curable polyisocyanate, which comprises reacting at least one diisocyanate a) in a first step with at least one compound b) under reaction conditions under which substantially formation of urethane takes place to give the diurethane, subsequently reacting the resultant diurethane in a second step with the same di- or polyisocyanate a) and/or a different di- or polyisocyanate c) under reaction conditions under which substantially formation of allophanate takes place, and then reacting the resultant allophanate-functional polyisocyanate in a third step with at least one compound d), wherein a), b), c), and d) have the same definition as in claim 1.

13. A process for preparing a water-emulsifiable, radiation-curable polyisocyanate, which comprises reacting at least one di- or polyisocyanate a) with a mixture of at least one compound b) and at least one compound d) under reaction conditions under which substantially formation of allophanate takes place, wherein a), b), and d) have the same definition as in claim 1.

14. The process according to claim 13, wherein use is made, as compounds containing isocyanurate groups, of those based on hexamethylenediamine and having an NCO content to DIN EN ISO 11909 of 21.5%-22.5%, a viscosity at 23° C. to DIN EN ISO 3219/A.3 of 2500-4000 mPas, and an average NCO functionality of 3.0 to 4.0.

15. The process according to claim 13, wherein use is made, as compounds containing biuret groups, of those based on hexamethylenediamine and having an NCO content to DIN EN ISO 11909 of 22%-24%, a viscosity at 23° C. to DIN EN ISO 3219/A.3 of 1500-6500 mPas, and an average NCO functionality of 3.0 to 4.0.

16. A composition for coating wood, paper, textile, leather, nonwoven, surfaces of plastics, glass, ceramic, mineral building materials or coated or uncoated metals which comprises the polyisocyanate according to claim 1.

17. A primer, surfacer, pigmented topcoat material or clearcoat in industrial coating, aircraft or large-vehicle coating, wood coating, automotive finishing, OEM finishing or refinish, or decorative coating which comprises the polyisocyanate according to claim 1.

* * * * *

UNITED STATES PATENT AND TRADEMARK OFFICE
CERTIFICATE OF CORRECTION

| | |
|---|---|
| PATENT NO. | : 7,943,682 B2 |
| APPLICATION NO. | : 12/094281 |
| DATED | : May 17, 2011 |
| INVENTOR(S) | : Eva Wagner et al. |

It is certified that error appears in the above-identified patent and that said Letters Patent is hereby corrected as shown below:

On the title page, the Terminal Disclaimer information has been omitted. Item (45) and the Notice information should read as follows:

Item -- (45)  **Date of Patent: *May 17, 2011**

On the Title Page:

The first or sole Notice should read --

Subject to any disclaimer, the term of this patent is extended or adjusted under 35 U.S.C. 154(b) by 52 days.

This patent is subject to a terminal disclaimer.

Signed and Sealed this
Nineteenth Day of July, 2011

David J. Kappos
*Director of the United States Patent and Trademark Office*